(12) United States Patent
Mochizuki et al.

(10) Patent No.: US 10,283,740 B2
(45) Date of Patent: May 7, 2019

(54) BATTERY PACKAGING MATERIAL

(71) Applicant: DAI NIPPON PRINTING CO., LTD., Tokyo (JP)

(72) Inventors: Youichi Mochizuki, Tokyo (JP); Rikiya Yamashita, Tokyo (JP); Makoto Amano, Tokyo (JP); Yousuke Hayakawa, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 49 days.

(21) Appl. No.: 15/325,826

(22) PCT Filed: Jul. 16, 2015

(86) PCT No.: PCT/JP2015/070452
§ 371 (c)(1),
(2) Date: Jan. 12, 2017

(87) PCT Pub. No.: WO2016/010125
PCT Pub. Date: Jan. 21, 2016

(65) Prior Publication Data
US 2017/0155101 A1   Jun. 1, 2017

(30) Foreign Application Priority Data
Jul. 17, 2014   (JP) .................... 2014-146695

(51) Int. Cl.
*H01M 2/02*   (2006.01)
*H01G 11/78*   (2013.01)
(Continued)

(52) U.S. Cl.
CPC ............. *H01M 2/0287* (2013.01); *B32B 7/12* (2013.01); *B32B 15/08* (2013.01); *B32B 15/085* (2013.01);
(Continued)

(58) Field of Classification Search
CPC .................................................. H01M 2/0287
See application file for complete search history.

(56) References Cited

U.S. PATENT DOCUMENTS 8,071,236 B2   12/2011   Seino et al.
8,455,135 B2   6/2013   Yamazaki et al.
(Continued)

FOREIGN PATENT DOCUMENTS

EP   2 955 770 A1   12/2015
EP   3 121 863 A1   1/2017
(Continued)

OTHER PUBLICATIONS

TranslationofJP2012104248.*
(Continued)

*Primary Examiner* — Sarah A. Slifka
*Assistant Examiner* — Brian R Ohara
(74) *Attorney, Agent, or Firm* — Oliff PLC

(57) ABSTRACT

A battery packaging material has a laminate in which at least a base material layer, a metal layer and a sealant layer are laminated in this order, wherein the sealant layer has a plurality of fatty acid amide-based lubricants, and at least one of the fatty acid amide-based lubricants is a saturated fatty acid amide.

9 Claims, 1 Drawing Sheet

(51) Int. Cl.
| | |
|---|---|
| *B32B 7/12* | (2006.01) |
| *B32B 15/08* | (2006.01) |
| *B32B 15/085* | (2006.01) |
| *B32B 15/18* | (2006.01) |
| *B32B 15/20* | (2006.01) |
| *B32B 27/18* | (2006.01) |
| *B32B 27/28* | (2006.01) |
| *B32B 27/30* | (2006.01) |
| *B32B 27/34* | (2006.01) |
| *B32B 27/36* | (2006.01) |
| *B32B 27/40* | (2006.01) |

(52) U.S. Cl.
CPC .............. *B32B 15/18* (2013.01); *B32B 15/20* (2013.01); *B32B 27/18* (2013.01); *B32B 27/283* (2013.01); *B32B 27/285* (2013.01); *B32B 27/30* (2013.01); *B32B 27/304* (2013.01); *B32B 27/34* (2013.01); *B32B 27/36* (2013.01); *B32B 27/40* (2013.01); *H01G 11/78* (2013.01); *H01M 2/02* (2013.01); *B32B 2255/10* (2013.01); *B32B 2255/26* (2013.01); *B32B 2264/02* (2013.01); *B32B 2270/00* (2013.01); *B32B 2307/31* (2013.01); *B32B 2307/516* (2013.01); *B32B 2307/518* (2013.01); *B32B 2307/7242* (2013.01); *B32B 2307/7265* (2013.01); *B32B 2307/732* (2013.01); *B32B 2307/738* (2013.01); *B32B 2439/00* (2013.01); *B32B 2457/10* (2013.01)

(56) References Cited

U.S. PATENT DOCUMENTS

| | | | |
|---|---|---|---|
| 2004/0029001 | A1 | 2/2004 | Yamazaki et al. |
| 2008/0286635 | A1 | 11/2008 | Seino et al. |
| 2013/0209868 | A1* | 8/2013 | Suzuta ................ H01M 2/0275 429/176 |
| 2014/0242333 | A1* | 8/2014 | Oono .................... B32B 15/095 428/141 |
| 2014/0242450 | A1* | 8/2014 | Oono .................... B32B 15/088 429/176 |
| 2015/0044546 | A1 | 2/2015 | Minamibori et al. |
| 2015/0372263 | A1 | 12/2015 | Douke et al. |
| 2016/0059520 | A1* | 3/2016 | Murata ............... H01M 2/0277 428/447 |
| 2016/0172638 | A1 | 6/2016 | Amano et al. |
| 2016/0204395 | A1* | 7/2016 | Oono .................... H01M 2/026 429/176 |

FOREIGN PATENT DOCUMENTS

| | | | | |
|---|---|---|---|---|
| JP | 2004-327044 | A | | 11/2004 |
| JP | 2005220307 | A | | 8/2005 |
| JP | 2008-287971 | A | | 11/2008 |
| JP | 2011-138793 | A | | 7/2011 |
| JP | WO 2012050182 | A1 | * | 4/2012 .......... H01M 2/0275 |
| JP | 2012-104248 | A | | 5/2012 |
| JP | 2012104248 | A | * | 5/2012 .......... H01M 2/0275 |
| JP | 2012-124068 | A | | 6/2012 |
| JP | 2013-235719 | A | | 11/2013 |
| JP | 2015-033828 | A | | 2/2015 |
| KR | 2013-0118867 | A | | 10/2013 |

OTHER PUBLICATIONS

Oct. 20, 2015 International Search Report issued in International Patent Application No. PCT/JP2015/070452.

Nov. 20, 2017 European Search Report issued in European Application No. 15822823.9.

Jul. 31, 2018 Office Action issued in Korean Application No. 10-2017-7001180.

* cited by examiner

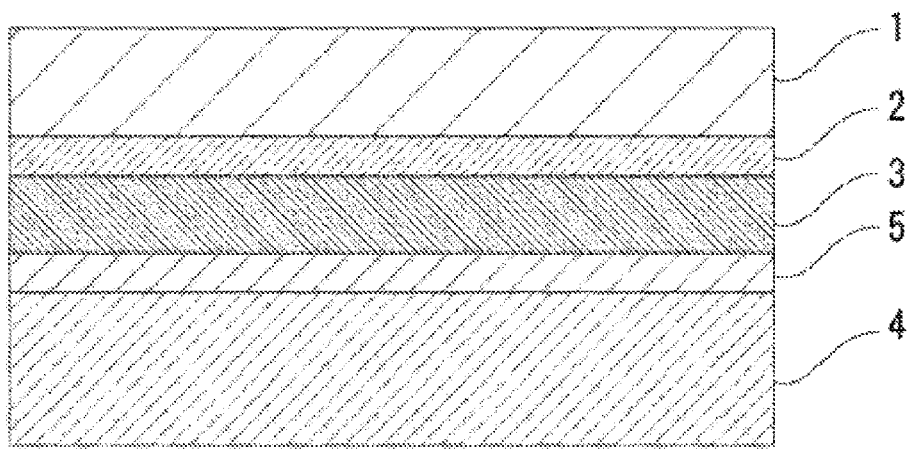

BATTERY PACKAGING MATERIAL

TECHNICAL FIELD

The present invention relates to a battery packaging material which has high moldability and which is excellent in continuous productivity of batteries.

BACKGROUND ART

Various types of batteries have been developed heretofore, and in every battery, a packaging material is an essential member for sealing battery elements such as an electrode and an electrolyte. Metallic packaging materials have often been used heretofore as battery packaging materials, but in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, a film-shaped laminate with a base material layer, an adhesive resin layer, a metal layer and a sealant layer laminated in this order has been proposed as a battery packaging material which is easily processed into diversified shapes and is capable of achieving thickness reduction and weight reduction (see, for example, Patent Document 1). The film-shaped battery packaging material is formed in such a manner that a battery element can be sealed by heat-welding the peripheral edge by heat sealing with the sealant layers facing each other.

The battery packaging material is molded with a mold at the time of enclosing a battery element, and is provided with a space for storing the battery element. During the molding, the battery packaging material is extended, so that cracks and pinholes are easily generated in a metal layer at a flange portion of the mold. Particularly, in recent years, a further thin battery packaging material has been desired as the battery has been required to have a reduced size and thickness. Thus, the above-mentioned problem has been increasingly encountered.

For solving the above-mentioned problem, a method has been generally employed in which an unsaturated fatty acid amide is added to a sealant layer, and thinly bled to a sealant surface, so that slippage is exhibited. A method is also known in which a coating layer of a lubricant is formed on a surface of a base material layer situated as an outermost layer of a battery packaging material to improve slippage of the base material layer. Similarly, it is conceivable that a coating layer of a lubricant is formed on a surface of a sealant layer situated as an innermost layer of a battery packaging material. When such a method is employed, the battery packaging material is easily drawn in the mold during molding, so that cracks and pinholes in the battery packaging material can be suppressed.

However, the unsaturated fatty acid amide relatively easily moves in a sealant layer of polypropylene etc., and ease of movement in the sealant layer depends particularly on a storage environment. For example, when the battery packaging material is stored at a high temperature of about 40° C. or higher, the unsaturated fatty acid amide penetrates into a sealant layer. As a result, slippage of a surface of the sealant layer may be reduced, leading to deterioration of moldability. On the other hand, when the battery packaging material is placed at a low temperature equal to or lower than room temperature, the saturated solubility of the unsaturated fatty acid amide in the sealant layer is reduced. Thus, a large amount of the unsaturated fatty acid amide may be bled out to a surface of the sealant layer, and deposited as a white powder to a processing apparatus such as a mold, resulting in marked deterioration of productivity.

Due to the above-mentioned problem, it is difficult to prevent the deterioration of moldability and troubles associated with a white powder while maintaining a constant added amount throughout a year. When a coating layer is separately formed on an outermost layer or innermost layer of the battery packaging material, the above-mentioned problem hardly occurs, but there is the disadvantage that the production cost increases.

PRIOR ART DOCUMENT

Patent Document

Patent Document 1: Japanese Patent Laid-Open Publication No. 2008-287971

SUMMARY OF THE INVENTION

Problems to be Solved by the Invention

Under these circumstances, an object of the present invention is to provide a battery packaging material which has high moldability and which is excellent in continuous productivity of batteries.

Means for Solving the Problems

The present inventors have extensively conducted studies for achieving the above-mentioned object. Resultantly, the present inventors have found that when in a battery packaging material including a laminate in which at least a base material layer, a metal layer and a sealant layer are laminated in this order, the sealant layer comprises a plurality of amide-based lubricants, and at least one of the fatty acid amide-based lubricants is a saturated fatty acid amide, not only slippage can be maintained even after storage at a high temperature, but also generation of a white powder due to excessive bleed-out of lubricants can be prevented, leading to improvement of continuous productivity of batteries. The present invention has been completed by further conducting studies based on the above-mentioned findings.

That is, the present invention provides inventions of the following aspects.

Item 1. A battery packaging material comprising a laminate in which at least a base material layer, a metal layer and a sealant layer are laminated in this order, wherein
the sealant layer comprises a plurality of fatty acid amide-based lubricants, and
at least one of the fatty acid amide-based lubricants is a saturated fatty acid amide.

Item 2. The battery packaging material according to item 1, wherein the plurality of fatty acid amide-based lubricants further include an unsaturated fatty acid amide.

Item 3. The battery packaging material according to item 1 or 2, wherein the saturated fatty acid amide has 18 or more carbon atoms.

Item 4. The battery packaging material according to any one of items 1 to 3, wherein the saturated fatty acid amide is a behenic acid amide.

Item 5. The battery packaging material according to item 2, wherein the unsaturated fatty acid amide is an erucic acid amide.

Item 6. The battery packaging material according to any one of items 1 to 5, wherein the sealant layer is formed of polypropylene.

Item 7. The battery packaging material according to any one of items 1 to 6, wherein an adhesive resin layer is laminated between the metal layer and the sealant layer.

Item 8. The battery packaging material according to any one of items 1 to 7, wherein the adhesive resin layer is formed of polypropylene.

Item 9. The battery packaging material according to item 7 or 8, wherein a total thickness of the adhesive resin layer and the sealant layer is 20 to 100 μm.

Item 10. The battery packaging material according to any one of items 7 to 9, wherein a total content ratio of the saturated fatty acid amide in the adhesive resin layer and the sealant layer is 20 ppm or more.

Item 11. The battery packaging material according to any one of items 1 to 10, wherein the metal layer is formed of an aluminum foil.

Item 12. A battery comprising a battery element including at least a positive electrode, a negative electrode and an electrolyte being stored in the battery packaging material according to any one of items 1 to 11.

Item 13. A method for producing a battery, the method comprising the step of:

storing in a battery packaging material a battery element including at least a positive electrode, a negative electrode and an electrolyte, wherein the battery packaging material includes a laminate in which at least a base material layer, a metal layer and a sealant layer are laminated in this order, the sealant layer comprises a plurality of fatty acid amide-based lubricants, and at least one of the fatty acid amide-based lubricants is a saturated fatty acid amide.

Item 14. Use, as a battery packaging material, of a laminate in which at least a base material layer, a metal layer and a sealant layer are laminated in this order, wherein the sealant layer comprises a plurality of fatty acid amide-based lubricants, and at least one of the fatty acid amide-based lubricants is a saturated fatty acid amide.

Advantages of the Invention

According to the present invention, there can be provided a battery packaging material which has high moldability and which is excellent in continuous productivity of batteries. Further, according to the present invention, there can be provided a battery produced using the battery packaging material.

BRIEF DESCRIPTION OF THE DRAWING

FIG. 1 is a drawing showing one example of a cross-sectional structure of a battery packaging material according to the present invention.

EMBODIMENT OF THE INVENTION

A battery packaging material according to the present invention is a battery packaging material including a laminate in which at least a base material layer, a metal layer and a sealant layer are laminated in this order, the sealant layer comprises a plurality of fatty acid amide-based lubricants, and at least one of the fatty acid amide-based lubricants is a saturated fatty acid amide. Hereinafter, the battery packaging material according to the present invention will be described in detail.

1. Laminated Structure of Battery Packaging Material

The battery packaging material according to the present invention includes a laminate in which at least a base material layer 1, a metal layer 3 and a sealant layer 4 are laminated in this order as shown in FIG. 1. In the battery packaging material according to the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element, so that the battery element is encapsulated.

As shown in FIG. 1, the battery packaging material according to the present invention may be provided with an adhesive resin layer 2 between the base material layer 1 and the metal layer 3 as necessary in order to improve adhesion of these layers. As shown in FIG. 1, the battery packaging material according to the present invention may be provided with an adhesive resin layer 5 between the metal layer 3 and the sealant layer 4 as necessary in order to improve adhesiveness of these layers.

In recent years, a further thin battery packaging material has been desired as the battery has been required to have a reduced size and thickness as described above. The total thickness of the battery packaging material according to the present invention is not particularly limited, but it is preferably about 25 to 80 μm, more preferably about 30 to 60 μm for obtaining a battery packaging material which has high moldability and which is excellent in continuous productivity of batteries while meeting the request for further thickness reduction.

2. Composition of Each Layer Forming Battery Packaging Material

[Base Material Layer 1]

In the battery packaging material according to the present invention, the base material layer 1 is a layer situated as an outermost layer. The material that forms the base material layer 1 is not particularly limited as long as it has insulation quality. Examples of the material that forms the base material layer 1 include polyesters, polyamides, epoxy resins, acrylic resins, fluororesins, polyurethanes, silicon resins, phenol resins, polyether imides, polyimides, and mixtures and copolymers thereof.

Specific examples of the polyester include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerized polyester including ethylene terephthalate as a main repeating unit include copolymer polyesters that are obtained by polymerizing ethylene isophthalate with ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate). Specific examples of the copolymerization polyester including butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1. The base material layer 1 may be formed by coating the top of the metal layer 3 with the above-mentioned material.

Among them, nylons and polyesters are preferred, and biaxially stretched nylons and biaxially stretched polyesters are further preferred, with biaxially stretched nylons being especially preferred, as resin films for formation of the base material layer 1.

The base material layer 1 can also be laminated with at least one of a resin film and a coating which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicone-based resins.

The friction of the base material layer 1 may be reduced for improving moldability. When the friction of the base material layer 1 is reduced, the friction coefficient of the surface thereof is not particularly limited, and it is, for example, 0.3 or less. Examples of the method for reducing the friction of the base material layer 1 include matting treatment, formation of a coating layer of a lubricant, and a combination thereof. In the present invention, the dynamic friction coefficient is a value measured by a method conforming to JIS K7125.

Examples of method of matting treatment include a method in which a matting agent is added to the base material layer 1 beforehand to form irregularities on the surface, a transfer method by heating or pressurization with an embossing roll, and a method in which the surface is mechanically roughened using dry or wet blasting, or a file. Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acryl, crosslinked styrene, crosslinked polyethylene, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The coating layer of a lubricant can be formed by precipitating a lubricant on the surface of the base material layer 1 by bleeding-out, or depositing a lubricant on the base material layer 1. The lubricant is not particularly limited, and examples thereof include amide-based lubricants as described later, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These lubricants may be used alone, or may be used in combination of two or more thereof.

The thickness of the base material layer 1 is, for example, 10 to 50 μm, preferably 15 to 30 μm.

[Adhesive Resin Layer 2]

In the battery packaging material according to the present invention, the adhesive resin layer 2 is a layer provided as necessary for bonding the base material layer 1 and the metal layer 3.

The adhesive resin layer 2 is formed from an adhesive capable of bonding the base material layer 1 and the metal layer 3. The adhesive agent used for forming the adhesive resin layer 2 may be a two-liquid curable adhesive agent, or may be a one-liquid curable adhesive agent. Further, the adhesion mechanism of the adhesive used for forming the adhesive resin layer 2 is not particularly limited, and may be any one of a chemical reaction type, a solvent volatilization type, a heat melting type, a heat pressing type and so on.

Specific examples of the resin component of the adhesive that can be used for forming the adhesive resin layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, acid-modified polyolefins and metal-modified polyolefins; polyvinyl acetate-based resins; cellulose-based adhesives; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive components may be used alone, or may be used in combination of two or more thereof. The combination form of two or more adhesive components is not particularly limited, and examples of the adhesive components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive agents; and polyamides, polyesters or blend resins of these resins and modified polyolefins are preferred because they are excellent in spreadability, durability and a transformation inhibition action under high-humidity conditions, a thermal degradation inhibition action during heat-sealing, and so on, and effectively suppress occurrence of delamination by inhibiting a reduction in lamination strength between the base material layer 1 and the metal layer 3.

The adhesive resin layer 2 may be made multilayered with different adhesive agent components. When the adhesive resin layer 2 is made multilayered with different components, it is preferred that a resin excellent in adhesion with the base material layer 1 is selected as an adhesive component to be disposed on the base material layer 1 side, and an adhesive component excellent in adhesion with the metal layer 3 is selected as an adhesive component to be disposed on the metal layer 3 side for improving the lamination strength between the base material layer 1 and the metal layer 3. When the adhesive resin layer 2 is made multilayered with different adhesive agent components, specific examples of the preferred adhesive agent component to be disposed on the metal layer 3 side include acid-modified polyolefins, metal-modified polyolefins, mixed resins of polyesters and acid-modified polyolefins, and resins containing a copolymerized polyester.

The thickness of the adhesive resin layer 2 is, for example, 2 to 50 μm, preferably 3 to 25 μm.

[Metal Layer 3]

In the battery packaging material according to the present invention, the metal layer 3 is a layer which is intended to improve the strength of the packaging material, and also functions as a barrier layer for preventing ingress of water vapor, oxygen, light and the like into the battery. Specific examples of the metal that forms the metal layer 3 include metal foils such as those of aluminum, stainless steel and titanium. Among them, aluminum is suitably used. For preventing occurrence of creases and pinholes during production of the packaging material, it is preferred to use soft aluminum, for example annealed aluminum (JIS A8021P-O) or (JIS A8079P-O), for the metal layer 3 in the present invention.

The thickness of metal layer 3 is, for example, 10 to 200 μm, preferably 20 to 100 μm.

Preferably, at least one surface, preferably the sealant layer 4-side surface, further preferably both surfaces, of the metal layer 3 is/are subjected to a chemical conversion treatment for stabilization of bonding, prevention of dissolution and corrosion, and so on. Here, the chemical conversion treatment is a treatment for forming an acid resistance film on the surface of the metal layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4). In the aminated phenol polymer, the repeating units represented by the following general formulae (1) to (4) may be contained alone, or may be contained in combination of two or more thereof.

[Chemical Formula 1]

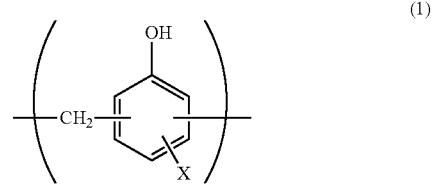
(1)

[Chemical Formula 2]

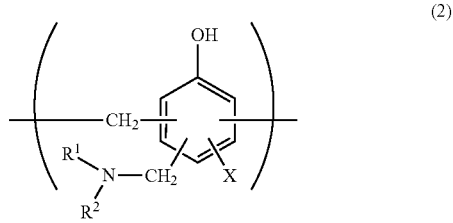
(2)

-continued

[Chemical Formula 3]

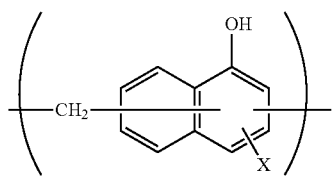

(3)

[Chemical Formula 4]

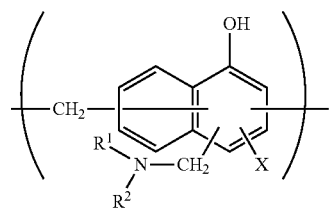

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistance film to be formed on the surface of the metal layer 3 in the chemical conversion treatment is not particularly limited, but for example when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied to the surface of the metal layer 3 by a bar coating method, a roll coating method, a gravure coating method, an immersion method or the like, and heating is then performed so that the temperature of the metal layer 3 is about 70 to 200° C. The metal layer 3 may be subjected to a degreasing treatment by an alkali immersion method, an electrolytic cleaning method, an acid cleaning method, an electrolytic acid cleaning method or the like before the metal layer 3 is subjected to the chemical conversion treatment. When a degreasing treatment is performed as described above, the chemical conversion treatment of the surface of the metal layer 3 can be further efficiently performed.

[Sealant Layer 4]

In the battery packaging material according to the present invention, the sealant layer 4 corresponds to the innermost layer, and during construction of a battery, the sealant layers are heat-welded to each other to hermetically seal the battery element.

Preferably, the sealant layer 4 is formed of a polyolefin resin. The polyolefin resin is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylene are preferred, with polypropylene being more preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene.

Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an $\alpha,\beta$-unsaturated carboxylic acid or an anhydride thereof replacing a part of monomers that form the cyclic polyolefin, or by block-polymerizing or graft-polymerizing an $\alpha,\beta$-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, polyolefins and carboxylic acid-modified polyolefins are preferred, with polypropylene and carboxylic acid-modified polypropylene being more preferred.

The sealant layer 4 may be formed from one resin component alone, or may be formed from a blend polymer obtained by combining two or more resin components. Further, the sealant layer 4 may include only one layer, or two or more layers formed of the same resin component or different resin components. When the sealant layer 4 includes two or more layers, examples of the preferred layer configuration include a layer configuration in which the outermost layer is formed of polypropylene, and a layer on the metal layer 3 side is formed of carboxylic acid-modified polypropylene.

The thickness of the sealant layer 4 may be appropriately selected, and it is about 10 to 100 μm, preferably about 15 to 50 μm.

In the battery packaging material according to the present invention, the sealant layer 4 comprises a plurality of amide-based lubricants. When the battery packaging material according to the present invention is subjected to molding in production of batteries, an amide-based lubricant exists at a surface of the sealant layer 4. Accordingly, slippage of the surface of the sealant layer 4 is improved, so that moldability of the battery packaging material according to the present invention is improved. The amide-based lubricant easily moves in resins such as polyolefin resins for forming the sealant layer 4 and the adhesive resin layer 5. Accordingly, even when only one of the sealant layer 4 and the adhesive resin layer 5 contains the amide-based lubricant immediately after the battery packaging material is produced, the sealant layer 4 contains the amide-based lubricant after elapse of time.

Examples of the method for causing the sealant layer 4 to comprise the amide-based lubricant include a method in which a surface of the sealant layer 4 of the battery packaging material is coated with the amide-based lubricant, and a method in which the amide-based lubricant is blended in a polyolefin resin etc. for forming the sealant layer 4 and/or the adhesive resin layer 5. When the amide-based lubricant is blended in a polyolefin resin etc. for forming the sealant layer 4 and/or the adhesive resin layer 5, the amide-based lubricant can be caused to exist at the surface of the sealant layer 4 by bleeding out the amide-based lubricant to the surface of the sealant layer 4. On the other hand, when the surface of the sealant layer 4 of the battery packaging material is coated with the amide-based lubricant, the amide-based lubricant can be caused to exist at the inside of the sealant layer 4 and/or the inside of the adhesive resin layer 5 by transference of a part of the amide-based lubricant from the surface to the inside. As a method for bleeding out the amide-based lubricant to the surface of the sealant layer 4, the battery packaging material is commonly aged at a slightly high temperature of about 30 to 50° C. for several hours to 3 days to acceleratingly bleed the amide-based lubricant, and as the temperature approaches the melting point of the amide-based lubricant, the saturation amount of the lubricant in the sealant layer 4 and the adhesive resin layer 5 increases. Therefore, it is necessary to pay attention to the added amount and the aging temperature.

In the present invention, the sealant layer 4 comprises a plurality of fatty acid amide-based lubricants, and at least one of the fatty acid amide-based lubricants is a saturated fatty acid amide.

In a conventional battery packaging material, an amide-based lubricant is blended in or applied to a sealant layer as described above. However, it has been found that although the amount of the amide-based lubricant applied to or blended in the sealant layer is set to a predetermined amount, the amide-based lubricant may be deposited on a mold during molding of a battery packaging material to deteriorate continuous productivity, or cracks and pinholes may be generated in the battery packaging material. It has been found that this is because in either the case where an amide-based lubricant is blended in or applied to a sealant layer, the amount of the amide-based lubricant situated on the surface of the sealant layer is considerably changed depending on an environment before the battery packaging material is subjected to molding after being produced, such as a storage or transportation environment before the battery packaging material is subjected to molding after being produced, particularly depending on a temperature change. It is considered that for example, when the battery packaging material is exposed to an environment at a high temperature of 40° C. or higher, the saturated solubility of the amide-based lubricant in the sealant layer increases, and therefore the amide-based lubricant existing at the surface of the sealant layer transfers to the inside of the sealant layer, resulting in deterioration of moldability of the sealant layer. On the other hand, when for prevention of this problem, the amount of the amide-based lubricant is increased, there is the problem that if the battery packaging material is not exposed to a high temperature, the amount of the amide-based lubricant existing at the surface of the sealant layer excessively large, so that the amide-based lubricant is deposited on a mold during molding, and contaminates the mold by forming a lump. Accordingly, for example, although a constant amount of the amide-based lubricant is used during production of the battery packaging material, the amount of the amide-based lubricant situated on the surface during molding is considerably changed depending on a storage environment etc., so that the amide-based lubricant may be deposited on a mold, leading to deterioration of continuous productivity, or cracks and pinholes may be generated in the battery packaging material. When an environment before the battery packaging material is subjected to molding after being produced, such as a storage or transportation environment before the battery packaging material is subjected to molding after being produced, particularly a temperature change is appropriately controlled, it is possible to suppress a change in amount of the amide-based lubricant after production and before molding of the battery packaging material, but practically, it may be unable to appropriately control the storage and transportation environments, and thus a problem in moldability or continuous productivity may occur only when the battery packaging material is subjected to molding.

On the other hand, the battery packaging material according to the present invention has high moldability and is excellent in continuous productivity of batteries even when exposed to a high temperature because the sealant layer 4 comprises a plurality of fatty acid amide-based lubricants, and at least one of the fatty acid amide-based lubricants is a saturated fatty acid amide. The mechanism in which the battery packaging material according to the present invention exhibits such an excellent effect may be considered, for example, as follows although details thereof are not clearly known. That is, in the battery packaging material according to the present invention, a saturated fatty acid amide which is once caused to exist at the surface of the sealant layer 4 by coating or bleeding-out hardly transfers to the inside of the sealant layer 4 even when the battery packaging material is exposed to a high-temperature environment because the saturated fatty acid amide has a saturated aliphatic hydrocarbon group, and therefore the saturated fatty acid amide remains at the surface of the sealant layer 4 even when the battery packaging material is stored or transported under an environment at a high temperature of 40° C. or higher, so that most of other amide-based lubricants transfer to the inside. Further, when the battery packaging material is not exposed to a high-temperature environment, the battery packaging material can exhibit high moldability and excellent continuous productivity of batteries because amide-based lubricants other than the saturated fatty acid amide exist at the inside or the surface of the sealant layer 4.

The saturated fatty acid amides may be used alone, or may be used in combination of two or more thereof. The saturated fatty acid amide is not particularly limited, but for further improving moldability and continuous productivity of batteries, saturated fatty acid amides having 18 or more carbon atoms are preferred, and stearic acid amides, behenic acid amides and arachidic acid amides are more preferred, with behenic acid amides being specially preferred.

In the present invention, the amide-based lubricant other than the saturated fatty acid amide is not particularly limited, and examples thereof include saturated fatty acid amides other than the saturated fatty acid amides shown above as an example, unsaturated fatty acid amides, substituted amides, methylol amides, saturated fatty acid bis-amides and unsaturated fatty acid bis-amides. Specific examples of the other saturated fatty acid amide include lauric acid amides, palmitic acid amides, stearic acid amides and hydroxystearic acid amides. Specific examples of the unsaturated fatty acid amide include oleic acid amides and erucic acid amides. Specific examples of the substituted amide include N-oleylpalmitic acid amides, N-stearylstearic acid amides, N-stearyloleic acid amides, N-oleylstearic acid amides and N-stearylerucic acid amides. Specific examples of the methylol amide include methylolstearic acid amides. Specific examples of the saturated fatty acid bis-amide include methylene-bis-stearic acid amides, ethylene-bis-capric acid amides, ethylene-bis-lauric acid amides, ethylene-bis-stearic acid amides, ethylene-bis-hydroxystearic acid amides, ethylene-bis-behenic acid amides, hexamethylene-bis-stearic acid amides, hexamethylene-bis-behenic acid amides, hexamethylene-hydroxystearic acid amides, N,N'-distearyladipic acid amides and N,N'-distearylsebacic acid amides. Specific examples of the unsaturated fatty acid bis-amide include ethylene-bis-oleic acid amides, ethylene-bis-erucic acid amides, hexamethylene-bis-oleic acid amides, N,N'-dioleyladipic acid amides and N,N'-dioleylsebacic acid amides. Specific examples of the fatty acid ester amide include stearamide ethyl stearates. Specific examples of the aromatic bis-amide include m-xylylene-bis-stearic acid amides, m-xylylene-bis-hydroxystearic acid amides and N,N'-distearylisophthalic acid amides. These amide-based lubricants may be used alone, or may be used in combination of two or more thereof.

In the present invention, it is preferred that a plurality of amide-based lubricants further include an unsaturated fatty acid amide in addition to the saturated fatty acid amide. Accordingly, moldability and continuous productivity of batteries when the battery packaging material is not exposed to a high temperature can be further improved. The mechanism thereof may be considered, for example, as follows although details thereof are not clearly known. That is, an unsaturated fatty acid amide has a double bond in the molecular structure, and takes on a structure in which an olefin chain is folded when molecules form an association. Accordingly, the unsaturated fatty acid amid relatively easily moves in the sealant layer, and is thus easily bled to a surface of the sealant layer, so that slippage is easily exhibited. On the other hand, a saturated fatty acid amide does not have a double bond in the molecular structure, is linear, and takes on a bulky structure when molecules form an associate (particularly when the number of carbon atoms is 18 or more), and therefore the saturated fatty acid amide is hard to bleed to a surface of the sealant layer even during storage at a high temperature, so that slippage is hardly exhibited. One assumption is that an unsaturated fatty acid amide and a fatty acid amide are associated with each other to form an association having moderate bleeding property and slippage. The second assumption is that an unsaturated fatty acid is first bled to form a first layer on a surface of the sealant layer, and a subsequently bled saturated fatty acid forms a second layer between the first layer and the sealant layer, so that further bleeding of the unsaturated fatty acid, which causes a white powder problem, is suppressed.

For the number of carbon atoms in the saturated fatty acid amide, an overheat weight loss in a temperature range of about 230 to 280° C. at which a resin (e.g. polypropylene) for forming the sealant layer 4 reaches about 50% or more when the number of carbon atoms is less than 18, and thus the number of carbon atoms is preferably 18 or more from the viewpoint of control of the content. Further, since the saturated fatty acid suppresses excessive bleeding of the lubricant (in either of the above-mentioned assumptions), the number of carbon atoms is preferably about 22 as in a behenic acid amide. The unsaturated fatty acid amide is especially preferably an erucic acid amide as the unsaturated fatty acid amide for further improving moldability and continuous productivity of batteries. The unsaturated fatty acid amides may be used alone, or may be used in combination of two or more thereof.

The total content ratio of the saturated fatty acid amide in the sealant layer 4 (at both the surface and the inside) in the battery packaging material according to the present invention is preferably 20 ppm or more, more preferably about 100 to 1000 ppm, still more preferably about 200 to 700 ppm, especially preferably about 600 to 900 ppm in terms of a mass in the sealant layer 4. When the sealant layer 4 contains an unsaturated fatty acid amide, the content ratio of the unsaturated fatty acid amide in the sealant layer 4 (at both the surface and the inside) is preferably 300 ppm or more, more preferably about 300 to 2000 ppm, still more preferably about 500 to 1500 ppm in terms of a mass in the sealant layer 4. Each of these values means a total content ratio where the saturated fatty acid amide or the unsaturated fatty acid amide existing at the surface or the inside of the sealant layer 4 is assumed to be wholly within the sealant layer 4. For example, when the amide-based lubricant is blended in a polyolefin resin for forming the sealant layer 4, the sealant layer 4 is formed by blending the amide-based lubricant in such a manner that the content ratio of the saturated fatty acid amide or the unsaturated fatty acid amide within the sealant layer 4 meets a value as described above, and resultantly the content ratio of the saturated fatty acid amide or the unsaturated fatty acid amide existing at the surface and the inside of the sealant layer 4 also meets a value as described above.

Further, when the adhesive resin layer 5 is laminated in the battery packaging material according to the present invention, the total content ratio of the saturated fatty acid amide in the sealant layer 4 (at both the surface and the inside) and the adhesive resin layer 5 is preferably 20 ppm or more, more preferably about 100 to 1000 ppm, still more preferably about 200 to 700 ppm, especially preferably about 600 to 900 ppm in terms of a mass in the sealant layer 4 and the adhesive resin layer 5. When at least one of the sealant layer 4 and the adhesive resin layer 5 contains an unsaturated fatty acid amide, the total content ratio of the unsaturated fatty acid amide in the sealant layer 4 (at both the surface and the inside) and the adhesive resin layer 5 is preferably 300 ppm or more, more preferably about 300 to 2000 ppm, still more preferably about 500 to 1500 ppm in terms of a mass in the sealant layer 4 and the adhesive resin layer 5. Each of these values means a total content ratio where the saturated fatty acid amide or the unsaturated fatty acid amide existing at the surface or the inside of the sealant layer 4 and in the adhesive resin layer 5 is assumed to be wholly within the sealant layer 4 and the adhesive resin layer 5. For example, when the amide-based lubricant is blended in a polyolefin resin for forming the sealant layer 4 and/or the adhesive resin layer 5, the sealant layer 4 and the adhesive resin layer 5 are formed by blending the amide-based lubricant in such a manner that the total content ratio of the saturated fatty acid amide or the unsaturated fatty acid amide within the sealant layer 4 and/or the adhesive resin layer 5 meets a value as described above, and resultantly the total content ratio of the saturated fatty acid amide or the unsaturated fatty acid amide existing at the surface and the inside of the sealant layer 4 and in the adhesive resin layer 5 also meets a value as described above.

The total content ratio of a plurality of amide-based lubricants in the sealant layer 4 in the battery packaging material according to the present invention is preferably 400 ppm or more, more preferably about 600 to 2400 ppm, still more preferably about 800 to 2200 ppm, especially preferably about 1800 to 2100 ppm in terms of a mass in the sealant layer 4. This value means a content ratio where a plurality of amide-based lubricants existing at the surface or the inside of the sealant layer 4 are assumed to be wholly within the sealant layer 4. For example, when the amide-based lubricant is blended in a resin for forming the sealant layer 4, the amide-based lubricant is blended in such a manner that the total content ratio of a plurality of amide-based lubricants within the sealant layer 4 meets a value as described above, and resultantly the total content ratio of a plurality of amide-based lubricants existing at the surface and the inside of the sealant layer also meets a value as described above. Similarly, when a surface of the sealant layer 4 is coated with the amide-based lubricant, the amide-based lubricant is blended in such a manner that the total coating amount meets a value as described above, and resultantly the total content ratio of a plurality of amide-based lubricants existing at the surface and the inside of the sealant layer 4 also meets a value as described above. A certain saturated lubricant amount corresponds to a certain kind of resin for forming the sealant layer 4, and the amount of the amide-based lubricant that is bled out to the surface varies depending on the thickness of the layer. Generally, the amount of the amide-based lubricant that is bled out to the surface of the sealant layer 4 increases as the thickness increases, and therefore when the thickness of the layer is large, an adjustment is made to reduce the concentration of the amide-based lubricant contained in the layer.

Further, when the adhesive resin layer 5 is laminated in the battery packaging material according to the present invention, the total content ratio of a plurality of amide-based lubricants in the sealant layer 4 and the adhesive resin layer 5 is preferably 400 ppm or more, more preferably about 600 to 2400 ppm, still more preferably about 800 to 2200 ppm, especially preferably about 1800 to 2100 ppm in terms of a mass in the sealant layer 4 and the adhesive resin layer 5. This value means a total content ratio where a plurality of amide-based lubricants existing at the surface or the inside of the sealant layer 4 and at the inside of the adhesive resin layer 5 are assumed to be wholly within the sealant layer 4 and the adhesive resin layer 5. For example, when the amide-based lubricant is blended in a resin for forming the sealant layer 4 and the adhesive resin layer 5, the amide-based lubricant is blended in such a manner that the total content ratio of a plurality of amide-based lubricants in the sealant layer 4 and the adhesive resin layer 5 meets a value as described above, and resultantly the total content ratio of a plurality of amide-based lubricants existing at the surface and the inside of the sealant layer and the adhesive resin layer 5 also meets a value as described above. Similarly, when a surface of the sealant layer 4 is coated with the amide-based lubricant, the amide-based lubricant is blended in such a manner that the total coating amount meets a value as described above, and resultantly the total content ratio of a plurality of amide-based lubricants existing at the surface and the inside of the sealant layer 4 and in the adhesive resin layer 5 also meets a value as described above. A certain saturated lubricant amount corresponds to a certain kind of resin for forming the sealant layer 4 and the adhesive resin layer 5, and the amount of the amide-based lubricant that is bled out to the surface varies depending on the thickness of the layer. Generally, the amount of the amide-based lubricant that is bled out to the surface of the sealant layer 4 increases as the thickness increases, and therefore when the thickness of the layer is large, an adjustment is made to reduce the concentration of the amide-based lubricant contained in the layer.

[Adhesive Resin Layer 5]

In the battery packaging material according to the present invention, the adhesive resin layer 5 is a layer that is provided between the metal layer 3 and the sealant layer 4 as necessary for strongly bonding these layers to each other. In the battery packaging material according to the present invention, the adhesive resin layer 5 may comprise a plurality of amide-based lubricants as described above. The kind and the content of the amide-based lubricant that may be contained in the adhesive resin layer 5 are as described above in the section [Sealant layer 4].

The adhesive resin layer 5 is formed from an adhesive capable of bonding the metal layer 3 and the sealant layer 4 to each other. The bonding mechanism, the kind of the adhesive agent component, and so on for the adhesive agent to be used for formation of the adhesive resin layer 5 are the same as those for the adhesive resin layer 2. The adhesive component to be used in the adhesive resin layer 5 is preferably a polyolefin resin, further preferably a carboxylic acid-modified polyolefin, especially preferably carboxylic acid-modified polypropylene.

The thickness of the adhesive resin layer 5 is, for example, 2 to 50 µm, preferably 15 to 30 µm.

The total thickness of the sealant layer 4 and the adhesive resin layer 5 may be appropriately selected, but it is preferably about 20 to 100 µm, more preferably about 25 to 80 µm, still more preferably about 30 to 60 µm.

3. Method for Producing Battery Packaging Material

While the method for producing the battery packaging material according to the present invention is not particularly limited as long as a laminate in which layers each having a predetermined composition are laminated is obtained, for example the following method is shown as an example.

First, a laminate in which the base material layer 1, the adhesive resin layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive resin layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive resin layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive resin layer 5 is provided between the metal layer 3 and the sealant layer 4, mentioned is provided, for example, by (1) a method in which the adhesive resin layer 5 and the sealant layer 4 are co-extruded to be laminated on the metal layer 3 of the laminate A (co-extrusion lamination method); (2) a method in which the adhesive resin layer 5 and the sealant layer 4 are laminated to form a laminate separately, and the laminate is laminated on the metal layer 3 of the laminate A by a thermal lamination method; (3) a method in which an adhesive agent for formation of the adhesive resin layer 5 is laminated on the metal layer 3 of the laminate A by, for example, a method of applying the adhesive agent onto the metal layer 3 with an extrusion method or solution coating, drying at a high temperature and baking, and the sealant layer 4 formed in a sheet shape beforehand is laminated on the adhesive resin layer 5 by a thermal lamination method; and (4) a method in which the melted adhesive resin layer 5 is poured between the metal layer 3 of the laminate A and the sealant layer 4 formed in a sheet shape beforehand, and simultaneously the laminate A and the sealant layer 4 are bonded together with the adhesive resin layer 5 interposed therebetween (sandwich lamination method). The laminate may be further subjected to a heating treatment such as that of heat roll contact type, hot air type or near- or far-infrared ray type, for enhancing the adhesion of the adhesive resin layer 2 and the adhesive resin layer 5 provided as necessary. As conditions for such a heating treatment, for example, the temperature is 150 to 250° C., and the time is several seconds to 1 minute.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where a sealant layer is in contact with itself) can be formed on the periphery of the battery element while a metal terminal connected to each of the positive electrode and the negative electrode protrudes to the outside, and the sealant layer at the flange portion is heat-sealed with itself, thereby providing a battery using a battery packaging material. When the battery element is stored using the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not limited to examples.

Examples 1 to 12 and Comparative Examples 1 to 4

<Production of Battery Packaging Material>

Both surfaces of an aluminum foil (thickness: 40 µm) as a metal layer were subjected to a chemical conversion treatment, and a nylon film as a base material layer having a thickness as described in Table 1 was bonded to one of the chemical conversion-treated surfaces with a polyester-based adhesive interposed therebetween by a dry lamination method in such a manner that the thickness of an adhesive resin layer was about 3 µm. Next, in Examples 1 to 6 and Comparative Examples 1 and 2, carboxylic acid-modified polypropylene as an adhesive resin layer having a thickness as described in Table 1 and polypropylene for forming a sealant layer with an amide-based lubricant blended therein so as to achieve a thickness and content as described in Table 1 were coextruded to the other chemical conversion-treated surface of the aluminum foil to obtain a laminate including a base material layer, an adhesive resin layer, an aluminum foil, an adhesive resin layer and a sealant layer. On the other hand, in Examples 7 to 12 and Comparative Examples 3 and 4, polypropylene for forming a sealant layer with an amide-based lubricant blended therein so as to achieve a thickness and content as described in Table 1 was laminated to the other chemical conversion-treated surface of the aluminum foil with carboxylic acid-modified polypropylene interposed therebetween by a dry lamination method, the carboxylic acid-modified polypropylene serving as an adhesive resin layer having a thickness as described in Table 1, so that a laminate including a base material layer, an adhesive resin layer, an aluminum foil, an adhesive resin layer and a sealant layer was obtained. Each battery packaging material was produced at a temperature of 20 to 30° C. and a relative humidity of 40 to 60%. The chemical conversion treatment was performed in the following manner: an aqueous solution including a phenol resin, a chromium fluoride compound and phosphoric acid was applied as a treatment liquid using a roll coating method, and baked under the condition of a film temperature of 180° C. or higher. The applied amount of chromium was 3 mg/m$^2$ (dry weight). The amide-based lubricants used are as listed below.

Unsaturated fatty acid amide: erucic acid amide
Saturated fatty acid amide: behenic acid amide
(Storage at Room Temperature or 40° C.)

The battery packaging material of each of Examples 1 to 12 and Comparative Examples 1 to 4 was left standing at room temperature (25° C.) or a temperature of 40° C. and a relative humidity of 50% for 14 days, followed by conducting a friction test, a moldability test and a white powder examination test as described below.

<Friction Test>

The friction test was conducted in accordance with a method conforming to JIS K7125. First, each battery packaging material obtained as described above was cut to samples having a size of 80×200 mm. Next, the samples were superimposed on one another in such a manner that surfaces of sealant layers faced one another, and a weight (200 g) was placed thereon. Rubber was bonded to the bottom surface of the weight, and the samples and the weight were brought into close contact with one another, so that they did not slip. Next, the weight was dragged at a speed of 100 mm/minute, the dynamic friction force (N) was measured, and the dynamic friction force was divided by the normal force (1.96 N) of the weight to calculate the dynamic friction coefficient. The obtained results were evaluated in accordance with the following criteria. The results are shown in Table 1.

○: The dynamic friction coefficient is 0.3 or less.
Δ: The dynamic friction coefficient is more than 0.3 and not more than 0.7.
x: The dynamic friction coefficient is more than 0.7.

(Moldability Test)

Each battery packaging material obtained as described above was cut to a rectangle of 80×120 mm to prepare a sample. Using a mold (female mold) having an opening size of 30×55 mm and a corresponding mold (male mold), the sample was cold-molded while the molding depth was changed by units of 0.5 mm from the molding depth of 0.5 mm under a pressing force of 0.24 MPa. This procedure was carried out for 10 samples at each depth. For the sample after the cold molding, the deepest of depths at which none of the 10 samples had creases, and pinholes and cracks in the aluminum foil was defined as the limit molding depth of the sample. From the limit depth, the moldability of the battery packaging material was evaluated in accordance with the following criteria. The results are shown in Table 1.

○: The limit molding depth is more than 6.5 mm.
Δ: The limit molding depth is 5.0 mm to 6.5 mm.
x: The limit molding depth is less than 5.0 mm.

(White Powder Examination Test)

A sheet of drawing paper cut to a size of 5×13 cm was folded in half, the sealant surface of each battery packaging material obtained as described above, which had a predetermined area (1 m$^2$) was strongly rubbed to deposit a white powder (bled-out lubricant), and the deposition degree was visually examined. The obtained results were evaluated in accordance with the following criteria. The results are shown in Table 1.

○: Almost not deposited.
Δ: Slightly deposited.
x: Markedly deposited.

TABLE 1

| | Thickness of base material layer | Thickness of adhesive resin layer | Thickness of sealant layer | Content of lubricant existing at inside and surface of sealant layer and adhesive resin layer | | After storage at room temperature for 14 days | | | After storage at 40° C. for 14 days | | |
|---|---|---|---|---|---|---|---|---|---|---|---|
| | | | | Unsaturated fatty acid amide | Saturated fatty acid amide | Friction | Moldability | White powder | Friction | Moldability | White powder |
| Comparative Example 1 | 15 μm | 20 μm | 15 μm | 1200 ppm | 0 ppm | ○ | ○ | Δ | X | X | ○ |
| Example 1 | | | | 1200 ppm | 20 ppm | ○ | ○ | ○ | Δ | Δ | ○ |
| Example 2 | | | | 1200 ppm | 100 ppm | ○ | ○ | ○ | Δ | Δ | ○ |
| Example 3 | | | | 1200 ppm | 300 ppm | ○ | ○ | ○ | Δ | Δ | ○ |
| Example 4 | | | | 1200 ppm | 600 ppm | ○ | ○ | ○ | ○ | ○ | ○ |
| Example 5 | | | | 1200 ppm | 900 ppm | ○ | ○ | ○ | ○ | ○ | ○ |
| Example 6 | | | | 1200 ppm | 1200 ppm | Δ | ○ | ○ | Δ | Δ | ○ |
| Comparative Example 2 | | | | 0 ppm | 1200 ppm | Δ | Δ | ○ | Δ | Δ | ○ |
| Comparative Example 3 | 25 μm | 23 μm | 23 μm | 1200 ppm | 0 ppm | ○ | ○ | X | X | X | ○ |
| Example 7 | | | | 1200 ppm | 20 ppm | ○ | ○ | Δ | ○ | ○ | ○ |
| Example 8 | | | | 1200 ppm | 100 ppm | ○ | ○ | Δ | ○ | ○ | ○ |
| Example 9 | | | | 1200 ppm | 300 ppm | ○ | ○ | Δ | ○ | ○ | ○ |

TABLE 1-continued

| | Thickness of base material layer | Thickness of adhesive resin layer | Thickness of sealant layer | Content of lubricant existing at inside and surface of sealant layer and adhesive resin layer | | After storage at room temperature for 14 days | | | After storage at 40° C. for 14 days | | |
|---|---|---|---|---|---|---|---|---|---|---|---|
| | | | | Unsaturated fatty acid amide | Saturated fatty acid amide | Friction | Moldability | White powder | Friction | Moldability | White powder |
| Example 10 | | | | 1200 ppm | 600 ppm | ○ | ○ | ○ | ○ | ○ | ○ |
| Example 11 | | | | 1200 ppm | 900 ppm | ○ | ○ | ○ | ○ | ○ | ○ |
| Example 12 | | | | 1200 ppm | 1200 ppm | ○ | ○ | Δ | ○ | ○ | Δ |
| Comparative Example 4 | | | | 0 ppm | 1200 ppm | Δ | Δ | ○ | Δ | Δ | ○ |

As evident from the results shown in Table 1, the battery packaging materials of Examples 1 to 12 in which a behenic acid amide as a saturated fatty acid amide having 22 carbon atoms and an erucic acid amide as an unsaturated fatty acid amide having 22 carbon atoms were used in combination as an amide-based lubricant exhibited good results or had no problem in practical use in all of the friction test, the moldability test and the white powder examination test not only when stored at room temperature but also when stored at a high temperature of 40° C.

On the other hand, the battery packaging material of Comparative Example 1 in which only an erucic acid amide was used as an amide-based lubricant was markedly inferior to the battery packaging materials of Examples 1 to 6 in the results of the friction test and the moldability test when the battery packaging material was stored at a high temperature of 40° C. The battery packaging material of Comparative Example 2 in which only a behenic acid amide was used as an amide-based lubricant was inferior in frictional coefficient and moldability to the battery packaging materials of Examples 1 to 6.

The battery packaging material of Comparative Example 3 in which only an erucic acid amide was used as an amide-based lubricant and the thickness of the sealant layer was made larger than that in Comparative Example 1 was inferior to the battery packaging materials of Examples 7 to 12 with the same thickness in the white powder examination test when the battery packaging material was stored at room temperature and in the frictional coefficient and moldability when the battery packaging material was stored at a high temperature. The battery packaging material of Comparative Example 4 in which only a behenic acid amide was used as an amide-based lubricant was inferior in frictional coefficient and moldability to the battery packaging materials of Examples 7 to 12 with the same thickness.

DESCRIPTION OF REFERENCE SIGNS

1: Base material layer
2: Adhesive resin layer
3: Metal layer
4: Sealant layer
5: Adhesive resin layer

The invention claimed is:

1. A battery packaging material comprising a laminate comprising:
   a base material layer,
   a metal layer, and
   a sealant layer comprising a plurality of fatty acid amide-based lubricants including an erucic acid amide and a behenic acid amide,
   wherein
   the base material layer, the metal layer, and the sealant layer are laminated in this order;
   a content ratio of the behenic acid amide in the sealant layer is in a range of from about 300 to 900 ppm in terms of a mass in the sealant layer; and
   a total content ratio of the erucic acid amide and the behenic acid amide in the sealant layer is in a range of from about 800 to 2200 ppm in terms of a mass in the sealant layer.

2. The battery packaging material according to claim 1, wherein the sealant layer is formed of polypropylene.

3. The battery packaging material according to claim 1, wherein an adhesive resin layer is laminated between the metal layer and the sealant layer.

4. The battery packaging material according to claim 3, wherein the adhesive resin layer is formed of polypropylene.

5. The battery packaging material according to claim 3, wherein a total thickness of the adhesive resin layer and the sealant layer is 20 to 100 μm.

6. The battery packaging material according to claim 3, wherein a total content ratio of the behenic acid amide in the adhesive resin layer and the sealant layer is in a range of from 300 to 900 ppm.

7. The battery packaging material according to claim 1, wherein the metal layer is formed of an aluminum foil.

8. A battery comprising a battery element including at least a positive electrode, a negative electrode and an electrolyte being stored in the battery packaging material according to claim 1.

9. A method for producing a battery, the method comprising:
   storing a battery element including at least a positive electrode, a negative electrode, and an electrolyte in a battery packaging material comprising a laminate comprising:
   a base material layer,
   a metal layer, and
   a sealant layer comprising a plurality of fatty acid amide-based lubricants including an erucic acid amide and a behenic acid amide,
   wherein
   the base material layer, the metal layer, and the sealant layer are laminated in this order;
   a content ratio of the behenic acid amide in the sealant layer is in a range of from about 300 to 900 ppm in terms of a mass in the sealant layer; and a total content ratio of the erucic acid amide and the behenic acid amide in the sealant layer is in a range of from about 800 to 2200 ppm in terms of a mass in the sealant layer.

* * * * *